United States Patent [19]
Nunes

[11] Patent Number: 5,842,574
[45] Date of Patent: Dec. 1, 1998

[54] CRAFT PACKAGE FOR MAKING INSTRUMENT FACE

[76] Inventor: Brendon G. Nunes, 467 Westney Road, South, Unit 3, Ajax, Ontario, Canada, L1S 6V7

[21] Appl. No.: 529,228

[22] Filed: Sep. 15, 1995

[51] Int. Cl.⁶ ................................................. B65D 69/00
[52] U.S. Cl. ...................... 206/575; 206/568; 220/4.23; 249/170
[58] Field of Search ................... 206/575, 579; 200/568; 249/117, 119, 127, 134, 170; 220/4.21, 4.22, 4.23, 4.26, 4.27; 434/81, 82, 84; 446/491

[56] References Cited

U.S. PATENT DOCUMENTS

| 839,987 | 1/1907 | Butters | 249/117 |
|---|---|---|---|
| 2,726,004 | 12/1955 | McLeod | 220/4.27 |
| 3,029,936 | 4/1962 | Graber | 206/575 |
| 4,416,632 | 11/1983 | Berman | 434/84 |
| 4,514,175 | 4/1985 | Zaruba et al. | 434/82 |
| 4,576,330 | 3/1986 | Schepp | 220/4.23 |
| 4,578,131 | 3/1986 | Hawkins, Jr. | 434/82 |
| 4,585,353 | 4/1986 | Shay | 368/262 |
| 4,720,820 | 1/1988 | Siefert | 368/76 |
| 4,749,281 | 6/1988 | Nunes . | |
| 4,988,321 | 1/1991 | Goldfarb | 446/491 |
| 5,121,835 | 6/1992 | Grupe | 206/575 |
| 5,129,522 | 7/1992 | Druskoczi | 206/575 |
| 5,370,353 | 12/1994 | Billson | 206/575 |
| 5,413,472 | 5/1995 | Dietterich et al. | 249/170 |
| 5,435,518 | 7/1995 | Iguchi | 206/575 |

OTHER PUBLICATIONS

"Rockite for Anchoring and Patching", Hartline Products Co., Inc. brochure.
Trademark registration 767,386 "Quikrete".
Trademark registration 1,042,903 "Quikrete and Design".
Trademark registration 391,990 "Quikrete".

*Primary Examiner*—Paul T. Sewell
*Assistant Examiner*—Nhan T. Lam
*Attorney, Agent, or Firm*—Nixon & Vanderhye P.C.

[57] ABSTRACT

A craft package for making a three dimensional utilitarian object, such as an instrument face, includes a first package portion of rigid transparent PVC with a wall thickness of between about 0.30–0.60 inches having a mold-shaped interior in the configuration or reverse configuration of a three dimensional object. A second package portion is fixed to the first package portion to form a container having an interior, and the second package portion is preferably another rigid plastic element having a mold-shaped interior in the configuration or reverse configuration of a second three dimensional object. A moldable material, such as plaster of paris, dry quick setting cementitious material, or a synthetic polymer curable at a temperature lower than the degradation temperature of the first package portion, is disposed in non-activated form within the container interior, and is of sufficient volume to form one of the three dimensional objects. Paint and a paint applicator may also be mounted within the container interior. An instrument face, when formed, has outwardly extending or recessed instrument face markings and it may be painted or otherwise decorated once cured and removed from the first or second package portion mold-shaped interior.

20 Claims, 3 Drawing Sheets

Fig. 3
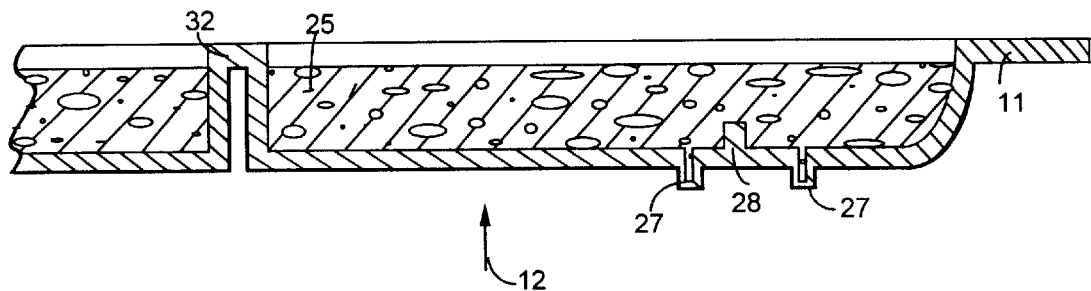
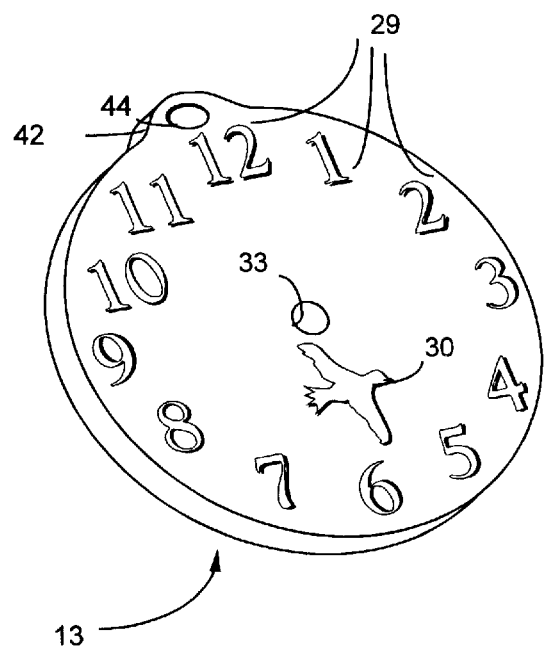
Fig. 4

5,842,574

CRAFT PACKAGE FOR MAKING INSTRUMENT FACE

BACKGROUND AND SUMMARY OF THE INVENTION

Many consumers enjoy purchasing utilitarian objects in the form of craft packages, which allow the consumer to exercise creativity in the final construction of the object, as well as have the feeling of accomplishment in production of the object. One particular type of utilitarian object that has not been produced in this manner heretofore is an instrument face (e.g. a face of a clock, thermometer, barometer, anemometer, or the like). Typically the production of three dimensional instrument faces has been done by manufacturers.

According to the present invention a craft package is provided which inexpensively allows the production of three dimensional utilitarian objects utilizing moldable material. The craft package according to the invention may be particularly useful for the manufacture of three dimensional instrument faces, including outwardly extending or recessed instrument face markings. The package according to the present invention is particularly cost effective since a part of the package itself is used as the mold for forming the three dimensional object, providing suitable utility while at the same time minimizing cost.

According to one aspect of the present invention a craft package for making a three dimensional object is provided comprising the following components: A disposable first package portion of rigid plastic, and having a mold-shaped interior in the configuration or reverse configuration of a three-dimensional utilitarian object. A disposable second package portion fixed to the first package portion to form a container having an interior. And, a moldable material capable of activation to set in the form of a three-dimensional object, the moldable material disposed in non-activated form within the container interior and having a volume at least sufficient to, when disposed in the mold-shaped interior, and activated, form a three-dimensional object.

The moldable material preferably is a quick setting cementitious material in dry form, such as sold under the trademark "Quikrete" by the Quikrete Company of Columbus, Ohio, or "Rockite" sold by Rockite of Cleveland, Ohio. Alternatively plaster of paris may be utilized, as may synthetic polymers curable at a temperature lower than the degradation temperature of the first package portion. Paint and a paint applicator, or other decorative materials (such as decals or stickers), may be mounted within the container interior, as may accessory components for use with the three dimensional object. For example where the three dimensional object is an instrument face an instrument movement associated with the instrument face may be disposed within the container interior.

The second package portion may also be of rigid plastic and have a mold shaped interior in the configuration or reverse configuration of a second three dimensional object, different than that produced from the first package portion. The first and second package portions may each comprise rigid PVC with a wall thickness of between about 0.30–0.60 inches. This is a sufficient material and thickness in order to properly function to protect the interior of the package during transport while providing an entirely suitable mold for the manufacture of the three dimensional object, but is disposable (that is intended to be discarded after one or several uses, and does not have sufficient structural integrity, chemical, and/or other properties to be used for the high volume production of objects therewith, and is inexpensive so that craft package formed utilizing it is cost effective).

According to another aspect of the present invention a craft package for making a three dimensional instrument face is provided comprising the following components: A first package portion of rigid plastic, and having a mold-shaped interior in the configuration or reverse configuration of a three-dimensional instrument face. And, a second package portion fixed to the first package portion to form a container having an interior. The details of the first and second package portions preferably are as described above, and the mold shaped interior of one or both of the first and second package portions preferably has surface manifestations which are configured as instrument face markings so that when moldable material is formed into a three dimensional instrument face using the first package portion, outwardly extending or recessed instrument face markings are provided thereon. Typically the moldable material is disposed in non-activated form within the container interior and has a volume at least sufficient to form at least one complete three dimensional instrument face (and typically at least two faces where both first and second package portions are instrument face molds).

The first package portion may include a central mold element which forms a through-extending opening in an instrument face form from the first package portion, the opening large enough to allow passage of an instrument movement shaft therethrough, which instrument movement may be mounted within the container interior.

According to another aspect of the present invention a method of making a three dimensional utilitarian object using a package comprising a substantially concave rigid first package portion connected to a second package portion to define an interior volume, and a moldable, activatable material, in non-activated form disposed within the interior volume, is provided. The method comprises the following steps: (a) Opening up the package by moving the first and second package portions with respect to each other to open up the interior volume thereof. (b) Removing the moldable, activatable material from the interior volume of the package. (c) Placing the moldable material in the concave rigid first package portion and activating it so that it forms in the shape of the concave rigid first package portion. And, (d) after step (c), once a completed utilitarian three-dimensional object is formed from the moldable material, removing the three-dimensional object from the rigid first package portion.

The package second portion preferably is also a substantially concave package portion for forming a different second three dimensional object. In that case there are the further steps of: (e) Placing the moldable material in the concave rigid second package portion and activating it so that it forms in the shape of the concave rigid second package portion. And, (f) after step (e), once a completed second three-dimensional object is formed from the moldable material, removing the second three-dimensional object from the rigid second package portion. Alternatively the package second portion, which is a substantially concave package portion for forming a different second three dimensional object, may be used instead of the first package portion in the practice of step(c). Particularly, steps (a) through (d) may be practiced to produce a three dimensional instrument face having raised or recessed instrument face markings, and there may be the further step of painting or otherwise decorating (e.g. by placing stickers or decals thereon) the three dimensional instrument face after step (d). Of course the paints and other decorating materials may also be provided within the package interior volume, as may an instrument movement associated with the instrument face.

It is the primary object of the present invention to provide for the cost effective craft production of three dimensional objects, particularly instrument faces. This and other objects of the invention will become clear from an inspection of the detailed description of the invention and from the appended claims.

BRIEF DESCRIPTION OF THE DRAWINGS

FIG. 3 is a partial side cross-sectional view of one half of the package of FIG. 2 showing moldable material disposed in the package for the production of a three dimensional object;

FIG. 4 is a top perspective view of an exemplary three dimensional object (instrument face) that may be produced utilizing the package of FIGS. 1 and 2;

DETAILED DESCRIPTION OF THE DRAWINGS

Figure 1:
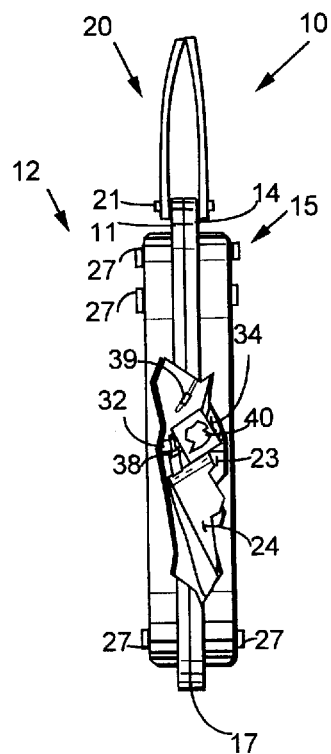
FIG. 1 is side view, with portions of the package cut away for illustrating interior components thereof, of one embodiment of an exemplary craft package according to the present invention.
Figure 2:
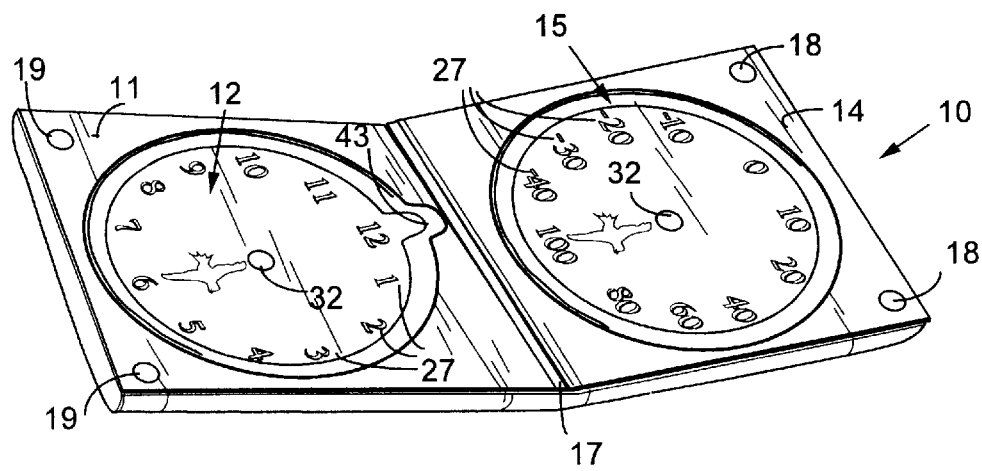
FIG. 2 is a top perspective view of the package of FIG. 1 shown opened up.

An exemplary craft package according to the present invention is shown generally by reference numeral 10 in FIGS. 1 and 2. The craft package 10 includes a first package portion 11 of rigid plastic, such as rigid PVC with a wall thickness of between about 0.30–0.60 inches (with different wall thicknesses for other alternative materials to rigid PVC) including a mold-shaped interior (e.g. typically concave when viewed from the interior of the package 10) in the configuration or reverse configuration of a three dimensional object. The particular three dimensional object illustrated and described with respect to the drawings is an instrument face, such as the clock face 13 illustrated in FIG. 4. Other instrument faces that are suitably produced according to the invention include thermometers, barometers, anemometers, and the like. While the invention is described with respect to instrument faces it should be understood that other three dimensional objects may also be produced utilizing the teachings of the invention. In each case the three dimensional object is utilitarian, that is it has some significant and specifically implemented function (i.e. other than as merely an art object or a paper weight), such as an ashtray, drinking cup, toy (such as a yo-yo or top), or the like.

Figure 5:
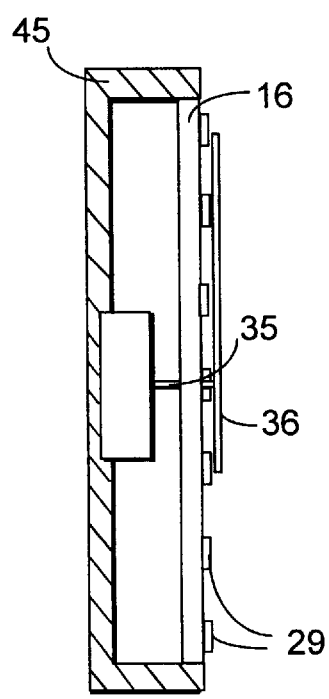
FIG. 5 is a side view, partly in cross-section and partly in elevation, of an instrument face produced according to the present invention shown mounted with a movement in an accessory casing.

The craft package 10 also includes a second package portion fixed to the first package portion 11 to form a container having an interior. In the embodiment illustrated in FIGS. 1 and 2, the second package portion also is of rigid plastic (such as rigid PVC with a wall thickness of between about 0.3–0.6 inches, and preferably transparent) as shown at 14 in FIGS. 1 and 2, having a second mold-shaped interior 15 (concave from the interior of the package 10) in the configuration or reverse configuration of a second three dimensional object different than the first three dimensional object produceable from the first mold-shaped interior 12. In the exemplary embodiment illustrated in FIG. 2, the mold-shaped interior 15 is configured to produce a thermometer instrument face while the first mold-shaped interior 12 is configured to produce a clock instrument face, such as shown at 13 in FIG. 4. A thermometer face produceable from the mold-shaped interior 15 is shown schematically at 16 in FIG. 5.

The particular manner in which the first and second package portions 11, 14 are connected together may vary widely. In the embodiment illustrated in FIGS. 1 and 2 the portions 11, 14 form or simulate a conventional "clam shell" package, of the type generally used for a wide variety of different packaged products. As such there is a hinged connection (typically of a thinner walled version of the same plastic forming the portions 11, 14) 17 connecting the portions 11, 14 together at one end thereof, with conventional projections 18 and recesses 19 (see FIG. 2) holding the portions 11, 14 together opposite the hinge 17. Adhesive may also be provided along the portions 11, 14 to assist and hold them together, and/or the optional packaging "card" shown schematically at 20 in FIG. 1 may be utilized.

The card 20, if utilized, typically is of cardboard or like sheet material, and has one or more openings therein that facilitate hanging of the package 10 on a hook for display, and includes product identification information and printed directions for use. The "card" 20 if utilized typically is fastened to the rest of the package 10 by adhesive or by a mechanical fastener, such as the staple or rivet shown schematically at 21 in FIG. 1. Instead of card 20 a hanger may be molded directly in one of the portions 11, 14, and an information sheet (not shown) disposed in the interior 12, 15. In this case at least one portion 11, 14 must be transparent so that the information sheet is visible from the exterior of the package 10.

The craft package 10 also preferably includes all of the materials necessary to make an appropriately decorated three dimensional utilitarian object from the package 10 inside the interior volume 23 (see FIG. 1) defined by the mold-shaped interiors 12, 15 of the package portions 11, 14. For example a bag or box 24 of moldable material is disposed within the volume 23. The moldable material in the package 24—which moldable material is shown at 25 in FIG. 3 being formed into a three dimensional object utilizing the package portion 11 with mold-shaped interior 12—is capable of activation to set in the form of the instrument face 13 or other three dimensional object. The moldable material is disposed in non-activated form in the box or bag 24 within the container interior 23, and there is a volume of the moldable material 25 within the bag or box 24 at least sufficient to, when disposed in the mold-shaped interior 12 (see FIG. 3), and activated, form a complete three dimensional instrument face 13 or other three dimensional object. Where both the package portions 11, 14 include mold-shaped interiors 12, 15, the volume of the moldable material is preferably at least sufficient to form two different instrument faces, one using each of the mold-shaped interiors 12, 15.

A wide variety of different moldable materials 25 may be utilized. One particularly desirable moldable material 25 is a quick setting cementitious material that is originally in dry form and is activated by the addition of water. Various versions of this material are available commercially under the trademark "Rockite" from Rockite of Cleveland, Ohio, or "Quikrete" from the Quikrete Company of Columbus, Ohio, and may be purchased in different colors, and with different characteristics depending upon the desired configuration of the three dimensional object (13) to be formed. Typically the cementitious material sets in about an hour or less at home ambient temperatures (e.g. between about 60°–800° F.), and the final product produced is completely smooth and has a finished appearance, and is aesthetically pleasing enough to be used as a final utilitarian object without painting or other decorating (although that still may be done). Other moldable materials that are also suitable are plaster of paris, and synthetic polymers curable at a temperature lower than the degradation temperature of the PVC or the like forming the mold-shaped interior 12. Plaster of paris also readily cures at home ambient temperatures, and synthetic polymers are available that cure at temperatures easily reached by home ovens and below temperatures at which the package portion 11 would so degrade that it could not form its molding function.

When the mold-shaped interior 12 is particularly configured to form an instrument face, such as the clock face 13, projections, or reverse projections, such as seen at 27 and 28 in FIG. 3, and at 27 in FIG. 1, are provided. These surface manifestations 27, 28 are configured as instrument face markings—such as forming the numbers 29 on the clock face 13, and optionally decorative indicia 30 thereon (see FIG. 4)—providing either outwardly extending or recessed instrument face markings 29, 30. In FIG. 4 the markings 29, 30 are shown as raised, but may be recessed if reverse projections (such as 28 in FIG. 3) are utilized.

The mold-shaped interior 12 when forming an instrument face 13 also includes a central mold element 32 which forms a through-extending opening in the instrument face 13 formed thereby, the opening being seen at 33 in FIG. 4 and being large enough to allow passage of an instrument movement shaft therethrough. For example see FIG. 5 where an instrument movement 34 includes a shaft 35 which extends through an opening (like the opening 33) in the instrument face 16 with one or more hands or indicators 36 moving over the raised indicia/instrument markings 29 on the instrument face 16.

Other components may also be provided in the container interior 23 in addition to box or bag 24 of moldable material 25. For example, as schematically illustrated in FIG. 1, the instrument movement 34 may be in the container interior 23 associated with at least one of the instrument faces produceable utilizing mold-shaped interiors 12,15, as well as paint (e.g. within tube 38 in FIG. 1), one or more paint applicators (such as the paint brush 39), or other decorative items (such as the decal or sticker 40).

The instrument face 13 when formed may include a mounting projection such as seen at 42 in FIG. 4 (formed from the mold 12 component 43 seen in FIG. 2), which also has an opening 44 formed therein either before or after molding. The movement 34 may be mounted to the back (opposite side from that shown in FIG. 4) of the instrument face 13,16 by adhesive, or the like, with the movement shaft extending through the opening 33 and the hands 36 traversing the instrument markings 29. Alternatively, the person making the craft instrument face 13 may mount it in an accessory casing, such as the casing 45 seen in FIG. 5, the materials for the casing 45 also provided within the container interior 23, or purchaseable separately, or produced independently by the user of the package 10.

Figure 6:
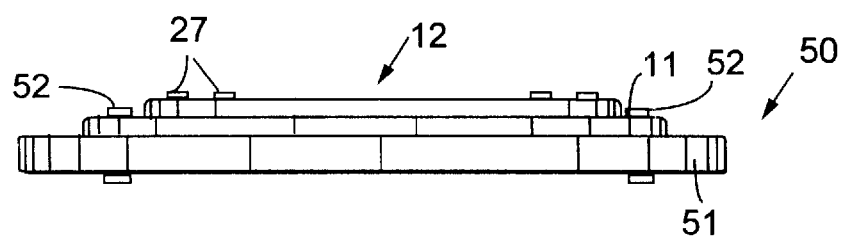
FIG. 6 is a schematic side view of an alternative exemplary craft package according to the present invention.

While the craft package 10 has been described with respect to two mold-shaped interior portions 12,15, under some circumstances only one portion of the package need have a mold-shaped interior. For example for the package 50 seen in FIG. 6 only the first package portion 11 has a mold-shaped interior portion 12, while the second package portion 51 is simply a piece of cardboard or other sheet material, the portion 11 held to the portion 51 by mechanical fasteners such as the staples or rivets 52 schematically illustrated in FIG. 6, and/or by adhesive.

In the use of the package 10 according to the present invention, the package 10 is opened up, such as by removing the card 20 and mechanical fastener 21, and detaching the cooperating projections and holes 18, 19, by pivoting the portions 11,14 about the hinge 17 as seen in FIG. 2. The moldable, activatable material 25 in the box or bag 24 within the container interior 23 is also removed, as are any other components therein such as the instrument movement 34, paint tube 38, paint brush 39, and sticker or decal 40. Then the typically dry moldable material 25 is poured or otherwise disposed in the mold-shaped interior 12, as see in FIG. 3, and activated, such as by the addition of water, catalyst, or heat thereto depending upon the particular moldable material 25 utilized. Where dry quick setting cementitious material (such as "Rockite" or "Quikrete") is utilized, it need merely be mixed with water and poured into the mold-shaped interior 12 and allowed to sit at ambient home temperature for about an hour.

Once the three dimensional object (clock face) 13 has formed (typically cured or hardened) within the concave interior 12, the portion 11 is separated from the instrument face 13. Depending upon the particular moldable material 25 utilized, and whether or not any treatment (such as a spray or brush on of a conventional mold-release agent, such as silicone, which also may be provided within the interior volume 23 of the package 10) is applied to the concave interior 12, separation may be accomplished without destruction of the package portion 11, in which case the package portion 11 may be reused several more times. However since the package portion 11 is designed to be disposable (being the same price or only moderately more expensive than conventional "clam shell" packaging) it is of little consequence that the package portion 11 is destroyed when being detached from the instrument face 13.

The instrument face 13 so produced, having the raised or recessed instrument markings 29 (and/or decorative markings 30) thereon may be painted or otherwise decorated (e.g. with decals, stickers, surface roughening or smoothing, such as by using hard instruments, sandpaper (e.g. also disposed in volume 23), or the like) an instrument shaft 35 is passed through the opening 33, and instrument movement 34 is attached to the back (when viewing FIG. 4) of the face 13 (or otherwise attached to a casing 45 or the like) and the instrument hands 36 traverse the instrument markings 29. The instrument face 13 may then be hung (as by a hook passing through the opening 44 in the mounting flange 42), mounted in a casing 45, or the like.

Where both package portions 11, 14 have mold-shaped interior volumes, the moldable material 25 may be disposed within either interior 12, 15 desired, or there may be sufficient volume of the material 25 in the box or bag 24 to make two (or even more) instrument faces 13.

It will thus be seen that according to the present invention an advantageous craft package for making a three dimensional object, such as an instrument face, in a simple, gratifying, and cost effective manner has been provided, as well as a corresponding method of making a three dimensional utilitarian object utilizing the package. While the invention has been herein shown and described in what is presently conceived to be the most practical and preferred embodiment thereof it will be apparent to those of ordinary skill in the art that many modifications may be made thereof, which scope is to be accorded the broadest interpretation of the appended claims so as to encompass all equivalent structures and methods.

What is claimed is:

1. A craft package for making a three dimensional instrument face, comprising:
    a first package portion of rigid plastic, and having a mold-shaped interior in the configuration or reverse configuration of a three-dimensional instrument face;
    a second package portion fixed to said first package portion to form a container having an interior, and
    a package of moldable material in said container interior.

2. A package as recited in claim 1 wherein said first package portion is of rigid PVC with a wall thickness of between about 0.30–0.60 inches.

3. A package as recited in claim 1 wherein said mold-shaped interior of said first package portion has surface manifestations which are configured as instrument face markings so that when moldable material is formed into a three-dimensional instrument face using said first package portion, outwardly extending or recessed instrument face markings are provided thereon.

4. A package as recited in claim 1 wherein said first package mold-shaped interior is for making a first instrument face; and wherein said second package portion is of rigid plastic, and has a mold-shaped interior in the configuration or reverse configuration of a second three-dimensional instrument face, different than said first face.

5. A package as recited in claim 1 wherein said moldable material is capable of activation to set in the form of an instrument face, said moldable material disposed in non-activated form within said package in said container interior and has a volume at least sufficient to, when disposed in said mold-shaped interior, and activated, form a complete three-dimensional instrument face.

6. A package as recited in claim 5 further comprising paint and a paint applicator mounted within said container interior.

7. A package as recited in claim 5 wherein said moldable material is dry quick setting cementitious material.

8. A package as recited in claim 1 wherein said first package portion includes a central mold element which forms a through extending opening in an instrument face formed from said first package portion, said opening large enough to allow passage of an instrument movement shaft therethrough, and further comprising an instrument movement associated with said instrument face disposed within said container interior.

9. A craft package as recited in claim 1 further comprising a packaging card of cardboard having one or more openings facilitating hanging of the package on a hook for display.

10. A package as recited in claim 9 wherein said packaging card is connected to said first and second package portions by a mechanical fastener.

11. A craft package for making a three-dimensional object, comprising:
    a disposable first package portion of rigid plastic, and having a mold-shaped interior in the configuration or reverse configuration of a three-dimensional utilitarian object;
    a disposable second package portion fixed to said first package portion to form a container having an interior; and
    a moldable material capable of activation to set in the form of a three-dimensional object, said moldable material disposed in non-activated form within said container interior and having a volume at least sufficient to, when disposed in said mold-shaped interior, and activated, form a three-dimensional object.

12. A package as recited in claim 11 wherein said moldable material is dry quick setting cementitious material.

13. A package as recited in claim 12 further comprising paint and a paint applicator mounted within said container interior.

14. A package as recited in claim 12 wherein said first package portion is of rigid transparent PVC with a wall thickness of between about 0.30–0.60 inches.

15. A package as recited in claim 11 wherein said first package portion is of rigid PVC with a wall thickness of between about 0.30–0.60 inches.

16. A package as recited in claim 15 wherein said first package portion mold-shaped interior is for making a first three dimensional object; and wherein said second package portion is of rigid plastic and has a mold-shaped interior and the configuration or reverse configuration of a second three dimensional object, different than said first object.

17. A package as recited in claim 16 wherein each of said mold-shaped interiors of said first and second package portions have surface manifestations which are configured as instrument face markings so that when said moldable material is formed into a three dimensional object it is formed into a three dimensional instrument face, outwardly extending a recessed instrument face markings being provided on an instrument face formed utilizing either said first or said second package portions.

18. A package as recited in claim 17 wherein said first and second package portions each include a central mold element which forms a through-extending opening and an instrument face formed therefrom, said opening large enough to allow passage of an instrument movement shaft therethrough.

19. A craft package as recited in claim 11 further comprising a packaging card of cardboard having one or more openings facilitating hanging of the package on a hook for display.

20. A package as recited in claim 19 wherein said packaging card is connected to said first and second package portions by a mechanical fastener.

* * * * *